(12) United States Patent
Chen et al.

(10) Patent No.: US 8,934,223 B2
(45) Date of Patent: Jan. 13, 2015

(54) ELECTRONIC DEVICE ENCLOSURE

(75) Inventors: Yao-Chung Chen, New Taipei (TW); Lung-Sheng Tsai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 431 days.

(21) Appl. No.: 13/404,081

(22) Filed: Feb. 24, 2012

(65) Prior Publication Data

US 2012/0318709 A1    Dec. 20, 2012

(30) Foreign Application Priority Data

Jun. 17, 2011  (TW) .................... 100121154

(51) Int. Cl.
 *H05K 5/00* (2006.01)
 *H05K 7/00* (2006.01)
 *H01R 13/62* (2006.01)
 *G11B 33/02* (2006.01)
 *G11B 33/12* (2006.01)
 *G06F 1/18* (2006.01)

(52) U.S. Cl.
 CPC .............. *G06F 1/187* (2013.01); *G11B 33/128* (2013.01)
 USPC ............ 361/679.02; 361/679.33; 361/679.34; 361/679.35; 361/679.36; 361/679.37; 248/84; 439/154; 369/75.11; 369/75.21

(58) Field of Classification Search
 USPC .............. 361/679.01–679.09, 679.1–679.19, 361/679.31–679.45, 679.55–679.6, 361/724–747; 248/80–88, 155.1–155.5, 248/166–173, 180.1–186.2, 229.1–231.51, 248/271.4, 292.14, 316.1–316.8; 439/60, 439/151–160, 327, 328, 331, 638; 369/75.1, 75.2, 75.11, 75.21, 76, 369/77.11, 77.21, 78, 79, 80, 81, 82
 See application file for complete search history.

(56) References Cited

U.S. PATENT DOCUMENTS

| | | | | |
|---|---|---|---|---|
| 5,112,119 | A * | 5/1992 | Cooke et al. | 312/283 |
| 2003/0210520 | A1 * | 11/2003 | Chien et al. | 361/685 |

* cited by examiner

*Primary Examiner* — Jerry Wu
(74) *Attorney, Agent, or Firm* — Novak Druce Connolly Bove + Quigg LLP

(57) ABSTRACT

An electronic device enclosure includes an inner tray and an outer tray. The inner tray includes a bottom plate. The outer tray receiving the inner tray and includes a base wall with a first bridge. The first bridge includes two first connecting panels and a first mounting panel between the two first connecting panels. Each of the two first connecting panels is slanted relative to the base wall. An acreage of the first mounting panel is less than an acreage of the base wall, and the base wall is engaged with the bottom plate via the first mounting panel by attaching the first mounting panel to the bottom plate, to decrease a contacting acreage between the base wall and the bottom plate.

17 Claims, 3 Drawing Sheets

ELECTRONIC DEVICE ENCLOSURE

BACKGROUND

1. Technical Field

The present disclosure relates to electronic device enclosures, more particularly to an enclosure for receiving hard disk drives.

2. Description of Related Art

An electronic device enclosure may have a housing to receive hard disk drives and include a first securing tray and a second securing tray closely attached to the first securing tray. When the hard disk drives are working, the first securing tray and the second securing tray may crash into each other and influence the stability of a server system of the electronic device enclosure. Therefore, an improved electronic device enclosure may be desired.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
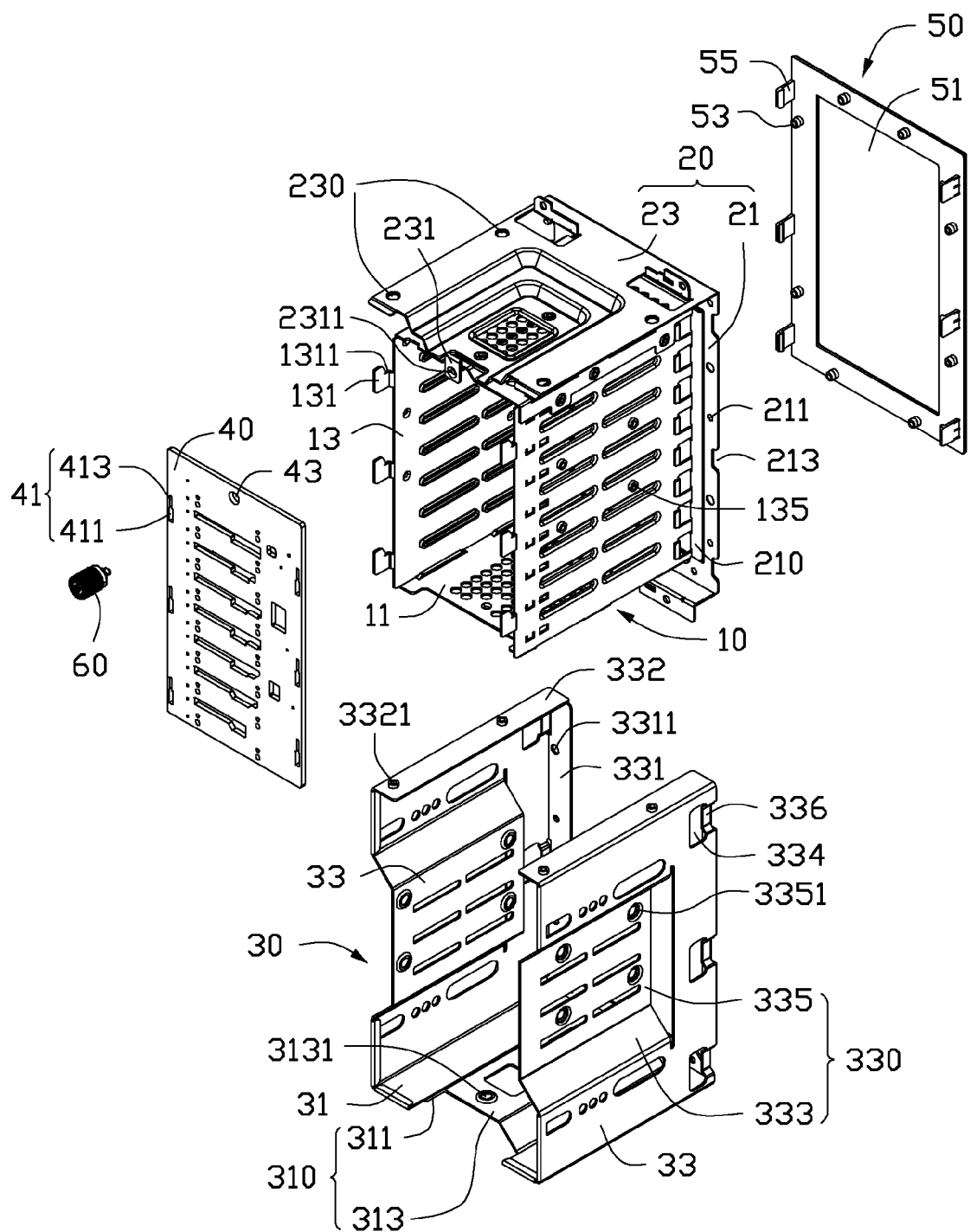
FIG. 1 is an exploded, isometric view of an electronic device enclosure in accordance with an embodiment.
Figure 2:
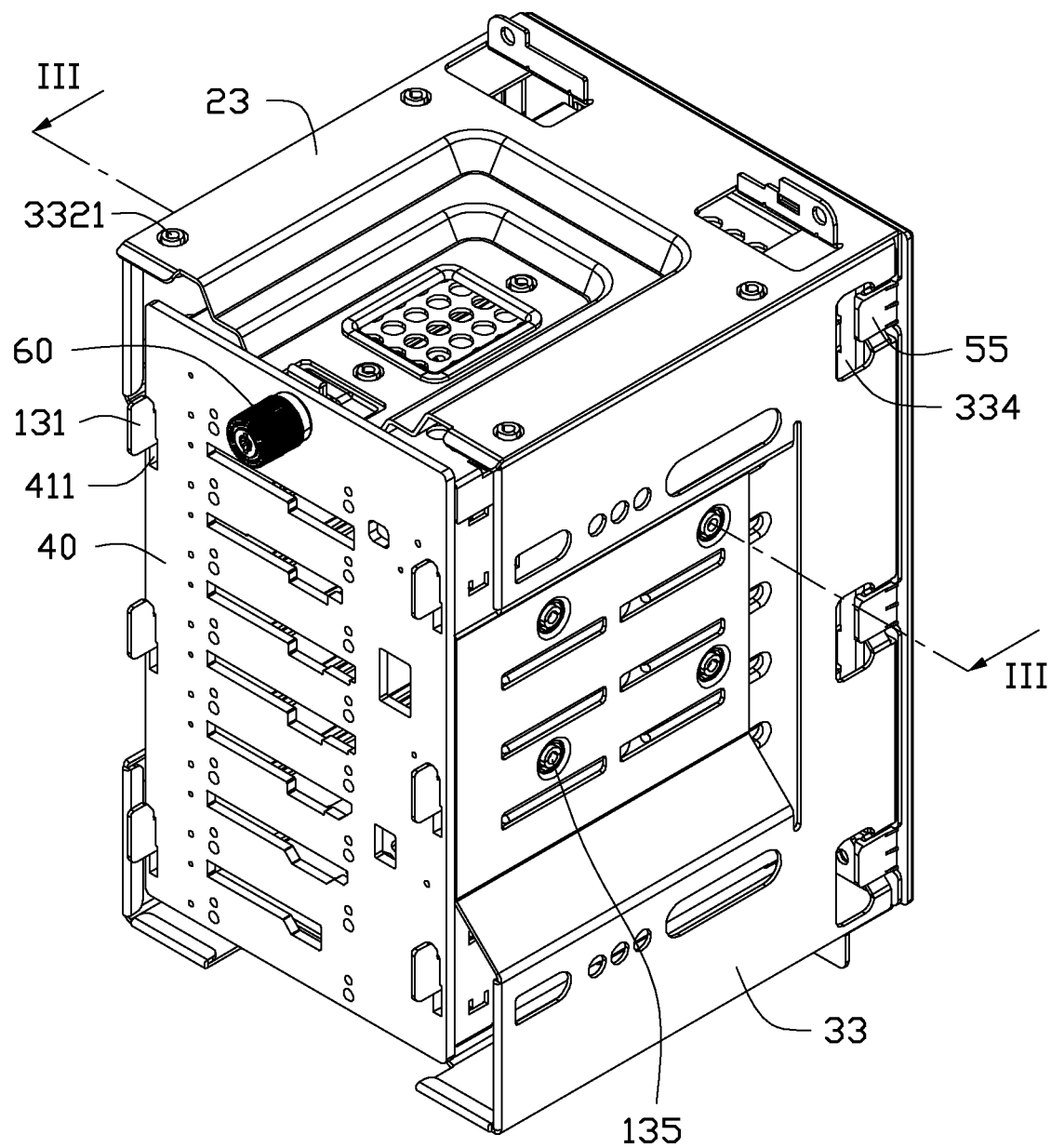
FIG. 2 is an assembled view of FIG. 1.

Referring to FIGS. 1 and 2, an electronic device enclosure in accordance with an embodiment includes an inner tray 10, a securing tray 20, an outer tray 30, a rear plate 40, and a decorating plate 50. The securing tray 20 is attached to a first side of the inner tray 10, and the decorating plate 50 is attached to the securing tray 20. The rear plate 40 is attached to a second side of the inner tray 10. In one embodiment, the inner tray 10 receives a plurality of hard disk drives (not shown).

The inner tray 10 includes a bottom plate 11, two side plates 13 extending from opposite edges of the bottom plate 11. In one embodiment, the two side plates 13 are substantially parallel to each other, and substantially perpendicular to the bottom plate 11. A plurality of first posts 112 (see FIG. 3) is located on the bottom plate 11. Three clipping members 131 extend from an edge of each of the two side plates 13, and a plurality of second posts 135 protrudes from each of the two side plates 13. Each of the three clipping members 131 and each of the two side plates 13 are located at the same plane, and a clipping slot 1311 is defined in each of the three clipping members 131.

The securing tray 20 includes a first securing plate 21 and a second securing plate 23 connected to the first securing plate 21. The first securing plate 21, secured to the inner tray 10, defines an opening 210 and a plurality of mounting holes 211. Three cutouts 213 are defined in the first securing plate 21. The second securing plate 23 defines two pairs of securing holes 230 located opposite sides of the second securing plate 23. A retaining piece 231, with a retaining hole 2311 defined thereon, extending from the second securing plate 23.

The outer tray 30 includes a base wall 31 and two sidewalls 33 extending from opposite edges of the base wall 31. A first bridge 310, located on the base wall 31, includes two first connecting panels 311 and a first mounting panel 313. Each of the two first connecting panels 311 is slanted relative to the first mounting panel 313. A plurality of first receiving holes 3131 corresponding to the plurality of first posts 112 is defined in the first mounting panel 313. In one embodiment, the first mounting panel 313 is above the base wall 31 and substantially parallel to the base wall 31. An obtuse angle is defined between each of the two first connecting panels 311 and the base wall 31. One of ordinary skill in the art will also realize that by this disclosure the first bridge 310 not limited to the present configuration. Rather, other configurations can be used in other embodiments, for example, an acute angle maybe defined between each of the two first connecting panels 311 and the base wall 31, or each of the two first connecting panels 311 may be substantially perpendicular to the base wall 31.

Each of the two sidewalls 33 includes a second bridge 330. The second bridge 330 has a same configuration to the first bridge 310, and includes two second connecting panels 333 and a second mounting panel 335. Each of the two second connecting panels 333 is slanted relative to each of the two sidewalls 33. A plurality of second receiving holes 3351 corresponding to the plurality of second posts 135 is defined in the second mounting panel 335.

A first flange 331 extends from a first edge of each of the two sidewalls 33, and a second flange 332 extends from a second edge of each sidewall 33. The first flange 331 defines a plurality of fixing holes 3311, corresponding to the plurality of mounting holes 211. The second flange 332 includes two positioning posts 3321 corresponding to the two pairs of securing holes 230. A hole 334 is defined in each of the two sidewalls 33 and adjacent to the first flange 331. A clipping piece 336 is located on each of the two sidewalls 33 and adjacent to the hole 334. In one embodiment, the second mounting panel 335 is substantially parallel to each of the two sidewalls 33. Each of the two second connecting panels 333 and each of the two sidewalls 33 cooperatively define an obtuse angle. One of ordinary skill in the art will also realize that by this disclosure the second bridge 330 not limited to the present configuration. Rather, other configurations can be used in other embodiments, for example, an acute angle maybe defined between each of the two second connecting panels 333 and each of the two sidewall 33s, or each of the two second connecting panels 333 may be substantially perpendicular to each of the two sidewalls 33.

The rear plate 40 defines a screw hole 43 and two groups of sliding slots 41. The screw hole 43 corresponds to the retaining hole 2311. Each group of the two groups of sliding slots 41 includes three sliding slots 41 arranged a straight line. Each sliding slot 41 includes a wide guiding portion 411 and a narrow positioning portion 413 communicating with the wide guiding portion 411.

The decorating plate 50 defines an entering opening 51, and a plurality of mounting posts 53 around the entering opening 51. A plurality of hooks 55 protrudes from the decorating plate 50 corresponding to the clipping piece 336.

Referring to FIG. 2, in assembly, the inner tray 10 is placed in the outer tray 30. The bottom plate 11 abuts the base wall 31, and the plurality of first posts 112 are received in the plurality of first receiving holes 3131. Each of the two side plates 13 abuts each of the two sidewalls 33, and each of the plurality of second posts 135 inserts into each of the plurality of second receiving holes 3351. Two of the first flanges 331 abuts the first securing plate 21, and the second flange 332 abut the second securing plate 23. The two positioning posts 3321 are engaged in the two pairs of securing holes 230, to secure the inner tray 10 to the outer tray 30.

The rear plate 40 is placed on the back of the inner tray 10, and the three clipping members 131 are received in the wide guiding portion 411. The rear plate 40 is moved in a direction substantially perpendicular to the base wall 31, and each of the three clipping members 131 slides to position in the narrow positioning portion 413. A mounting member 60, such as a screw, is engaged in the screw hole 43 and the retaining hole 2311, to secure the rear plate 40 to the inner tray 10.

The decorating plate 50 abuts the first securing plate 21. The plurality of mounting posts 53 extend through the plurality if fixing holes 3311 and each of the plurality of mounting holes 211. The plurality of hooks 55 extend through the three cutouts 213 to engage with the clipping piece 336 and received in the hole 334, to secure the decorating plate 50 to the first securing plate 21.

Figure 3:
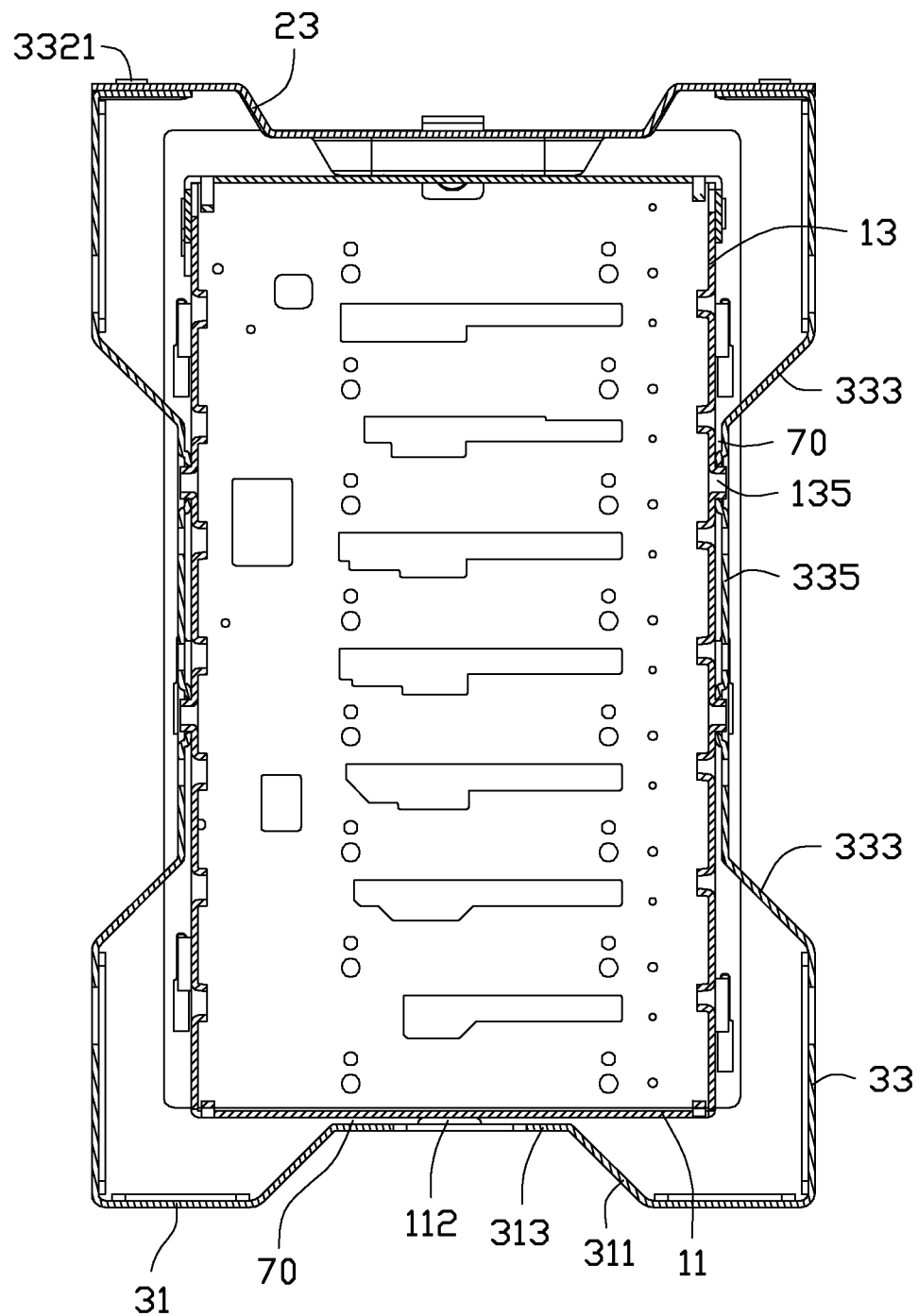
FIG. 3 is a partial cross-sectional view of FIG. 2 along line III-III.

Referring to FIG. 3, in use, when a plurality of shake generated by the hard disk drives in the inner tray 10. The outer tray 30 is connected to the inner tray 10 by the first mounting panel 313 abutting the bottom plate 11, and also with the second mounting panel 335 abutting each of the two side plates 13. Therefore, the contracting acreage between the inner tray 10 and the outer tray 30 is decreased. The odds of crashing between the bottom plate 11 and the base wall 31 is decreased, and the odds of crashing between each of the two side plates 13 and the base wall 31 is also decreased. In addition, a gap 70 is defined between the first mounting panel 313 and the bottom plate 11, and also defined between the second mounting panel 335 and each of the two side plates 13. The gap 70 can also decrease the odds of crashed between the bottom plate 11 and the base wall 31, and the gap 70 can also decrease between each of the two side plates 13 and the base wall 31.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. An electronic device enclosure comprising: an inner tray comprising a bottom plate; and
an outer tray receiving the inner tray and comprising a base wall;
the base wall comprising a first bridge; the first bridge comprising two first connecting panels and a first mounting panel between the two first connecting panels; each of the two first connecting panels being slanted relative to the base wall;
wherein an area of the first mounting panel is less than an area of the base wall excluding an area of the first bridge, and the base wall is engaged with the bottom plate via the first mounting panel by attaching the first mounting panel to the bottom plate, to decrease a contacting area between the base wall and the bottom plate; and
a securing tray secured to a front side and a top side of the inner tray and a decorating plate attached to the securing tray, the decorating plate comprising a hook, the outer tray comprising a clipping piece on a sidewall substantially perpendicular to the base wall, and the hook extending through the securing tray and engaged with the clipping piece.

2. The electronic device enclosure of claim 1, wherein the first mounting panel is located on a first plane, and the base wall is located on a second plane below the first plane.

3. The electronic device enclosure of claim 2, wherein the first mounting panel is substantially parallel to the base wall.

4. The electronic device enclosure of claim 1, wherein the first mounting panel defines a first receiving hole, the bottom plate comprises a first post engaged in the first receiving hole, and a gap is defined between the bottom plate and the first mounting panel.

5. The electronic device enclosure of claim 1, wherein an obtuse angle is defined between each of the two first connecting panels and the first mounting panel.

6. The electronic device enclosure of claim 1, wherein the outer tray further comprise two sidewalls substantially perpendicular to the base wall, each of the two sidewalls comprises a second bridge, and the second bridge has a configuration same as a configuration of the first bridge.

7. The electronic device enclosure of claim 1, wherein the securing tray comprising a first securing plate, and the first securing plate defines a cutout to accommodate the hook to extend through the first securing plate.

8. The electronic device enclosure of claim 7, wherein the securing tray further comprising a second securing plate, the outer tray comprises a first flange and a second flange, the first flange is secured to the first securing plate, and the second flange is secured to the second securing plate.

9. The electronic device enclosure of claim 1, further comprising a rear plate attached to the inner tray, the rear plate defining a sliding slot, and the inner tray comprising a clipping member slidably received in the sliding slot.

10. An electronic device enclosure comprising: an inner tray comprising a bottom plate; and
an outer tray receiving the inner tray and comprising a base wall;
the base wall comprising a first bridge; the first bridge comprising a first mounting panel substantially parallel to the base wall; the first mounting panel being located on a first plane, and the base wall being located on a second plane below the first plane; wherein an area of the first mounting panel is less than an area of the base wall excluding an area of the first bridge, and the base wall is engaged with the bottom plate via the first mounting panel by attaching the first mounting panel to the bottom plate, to decrease a contacting area between the base wall and the bottom plate; and
a securing tray secured to a front side and a top side of the inner tray and a decorating plate attached to the securing tray, the decorating plate comprising a hook, the outer tray comprising a clipping piece on a sidewall substantially perpendicular to the base wall, and the hook extending through the securing tray and engaged with the clipping piece.

11. The electronic device enclosure of claim 10, wherein the first bridge further comprises two first connecting panels; each of the two first connecting panels is connected to an opposite edge of the first mounting panel; and each of the two first connecting panels is slanted relative to the base wall.

12. The electronic device enclosure of claim 11, wherein an obtuse angle is defined between each of the two first connecting panels and the first mounting panel.

13. The electronic device enclosure of claim 11, wherein the outer tray further comprise two sidewalls substantially perpendicular to the base wall, each of the two sidewalls comprises a second bridge, and the second bridge has a configuration same as a configuration of the first bridge.

14. The electronic device enclosure of claim 10, wherein the first mounting panel defines a first receiving hole, the bottom plate comprises a first post engaged in the first receiving hole, and a gap is defined between the bottom plate and the first mounting panel.

15. The electronic device enclosure of claim 10, wherein the securing tray comprising a first securing plate, and the first securing plate defines a cutout to accommodate the hook to extend though the first securing plate.

16. The electronic device enclosure of claim 15, wherein the securing tray further comprising a second securing plate, the outer tray comprises a first flange and a second flange, the first flange is secured to the first securing plate, and the second flange is secured to the second securing plate.

17. The electronic device enclosure of claim 10, further comprising a rear plate attached to the inner tray, the rear plate defining a sliding slot, and the inner tray comprising a clipping member slidably received in the sliding slot.

\* \* \* \* \*